United States Patent [19] [11] 3,789,368
Derville [45] Jan. 29, 1974

[54] PROGRAMME TRANSLATION AND REENTRANCE DEVICE

[75] Inventor: Denis Derville, Paris, France

[73] Assignee: Compagnie International Pour L'Informatique, Louveciennes, France

[22] Filed: Apr. 12, 1972

[21] Appl. No.: 243,304

[30] Foreign Application Priority Data

Apr. 21, 1971 France ........ 7114102

[52] U.S. Cl. ........ 340/172.5
[51] Int. Cl. ........ G11c 7/00
[58] Field of Search ........ 340/172.5

[56] References Cited

UNITED STATES PATENTS 3,461,433 8/1969 Emerson ........ 340/172.5
3,530,439 9/1970 Smith ........ 340/172.5

*Primary Examiner*—Raulfe B. Zache
*Attorney, Agent, or Firm*—Solon B. Kemon et al.

[57] ABSTRACT

In a multi-programmation digital data system, each translation of a programme with respect to a store is controlled by an organization comprising a translation base code register, the content of said register pointing the zone of the store allotted to the instructions and data of the concerned programme and an adder which adds the content of said register to the addresses of the words of the said concerned programme prior their application to the address register of the store. According to the invention, there is provided a bistable member one of the outputs of which, when activated, marks a condition of translation of a programme and the other output of which, when activated, marks a condition of reentrance of a routine of a programme. Said bistable member is set at the beginning of a translation or a reentrance operation in the system and controls a logical organization which adds the content of said register to any and all addresses for a translation operation and to the addresses which, in a reentrant routine, concern parameters and variables whilst avoiding such an addition to the addresses concerning invariants of the routine.

5 Claims, 2 Drawing Figures

PATENTED JAN 29 1974

3,789,368

SHEET 1 OF 2

PROGRAMME TRANSLATION AND REENTRANCE DEVICE

BRIEF SUMMARY OF THE INVENTION

The present invention concerns improvements in or relating to digital data processing systems operating under the multi-programmation mode.

In such systems, several programmes or parts of programmes may be simultaneously handled in a time sharing or imbricating mode. Routines or sub-routines are made common to the programmes and, when necessary, a programme may call for the one it requests of such routines or sub-routines. Usually, the programmes are stored in a large capacity "external" store and are individually called for execution into a faster access store wherein each word is provided with a "local" address.

In such systems, part of the storing facilities is common to all programmes, data and routines or subroutines and asid common part is managed on a dynamic basis or mode, so that it is necessary that programme translations can be made, i.e., copying operations of the content of a memory zone to another memory zone of the common part of the said storing facilities. For the sake of simplicity, that common part of the storing facilities of the system will be hereinafter named the "common store" and, for the sake of simplicity, too, only the term "subroutine" will be used for the parts of the series of instructions and correlated invariant data which are common to the programmes.

The addresses of the words of any translated programme must obviously be actualized according to the effective implantation of such words in the stores. Said actualization can be made, at least partly and preferably in toto, from recourse to a translation base code register the content of which is added to each address prior its use for accessing to a stored word.

The operation of a multi-programmation system with common subroutines of instructions and intrinsic data therefor (often said to be the "local" data of a subroutine) must further be such that the same sub-routine can be called for by several programmes which are handled in a time imbricating mode, such calls being made at distinct time periods. A consequence of this possibility is that several sets of data, intermediate and final results will simultaneously exist for a same subroutine which is executed within two or more distinct programmes. Each such set comprises : subroutine intrinsic data, data and parameters pertaining to the programme which had called for the subroutine, intermediate and final results pertaining to the programme proper. For ensuring a correct reentrance into the store of a subroutine, it is imperative that the memorizing locations of the data be separate. This was ensured up to now by providing the complete memorization of each sut set of words at a location defined by the effective implantation of the programme which had called for the concerned subroutine.

It is an object of the invention to so provide a reentrance of sub-routines that it eliminates the necessity of storing at a programme location both the words pertaining to said programme and to said sub-routines.

It is a further object of the invention to so provide such a reentrance of the subroutines that it makes use, according to a special exploitation thereof, of the translation base code register. As said, such register contains at each step of a programme handling, a value which points the memory zone of the store affected to the programme which is being executed, said zone cannot consequently contains any parameter or variable processed by a subroutine for another programme which may have called the same subroutine at a different instant of time.

It is consequently a further object of the invention to provide an ambivalent function device which can control as well the translations as the reentrances in such systems.

According to a feature of the invention, this device comprises the combination of a bistable member the activated respective conditions of the outputs of which respectively mark programme translation and subroutine reentrance conditions, control means setting the condition of said bistable member at the beginning of a translation or reentrance operation in the system, and means controlled from the output conditions of said bistable member, controlling the addition of the content of the translation base code register to any word address of a translated programme and to any word address of parameters and variables which, in any reentrant subroutine, pertain to the programme and inhibiting such an addition to the word addresses of the instructions and intrinsic data of the subroutines.

Figure 1:
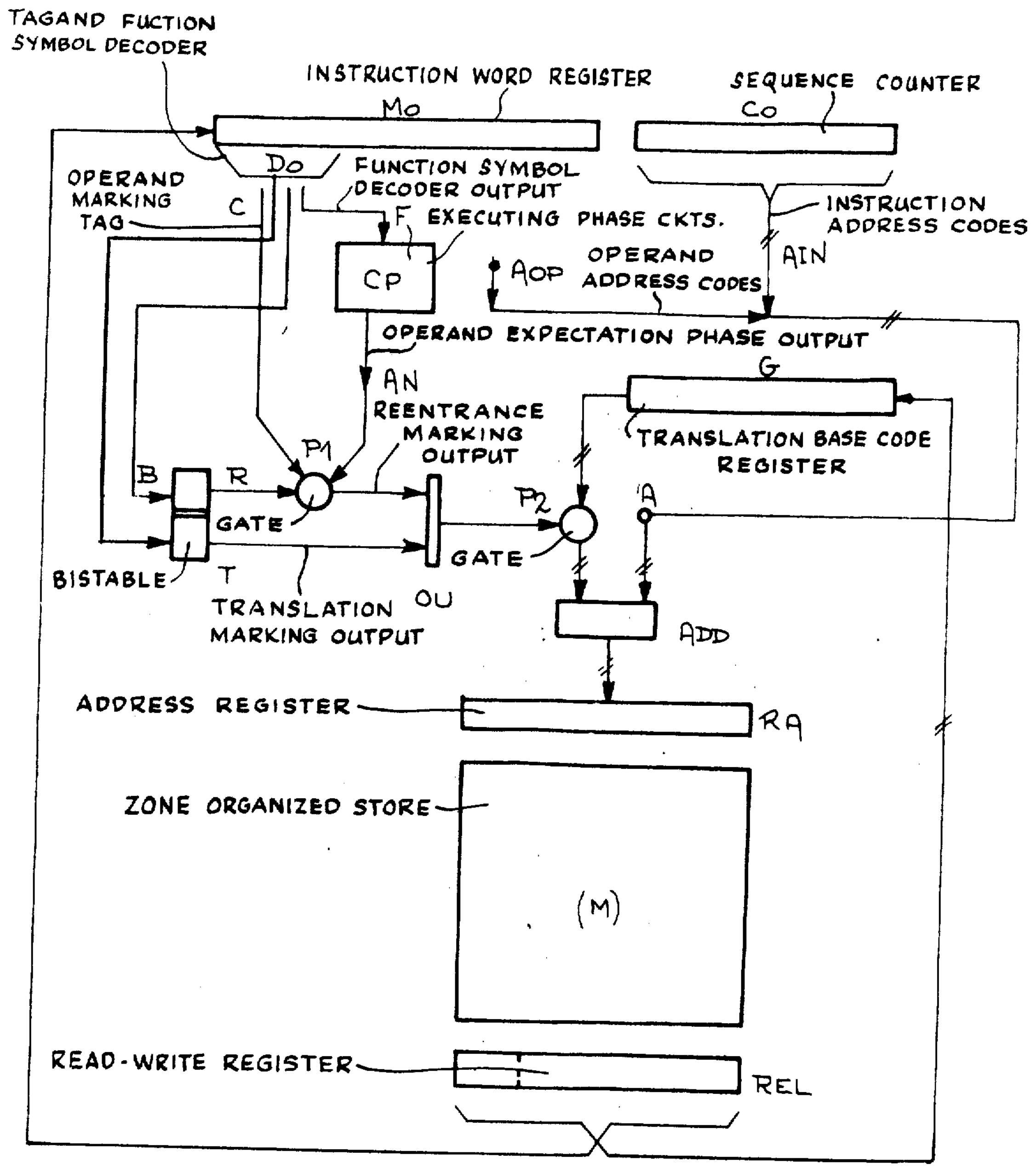
FIG. 1 shows one embodiment of a device according to the present invention.

DETAILED DESCRIPTION (M) is a fast access store provided with its conventional address register RA and read/write register REL. G is the usual translation base code register, Co is the conventional sequence switch or counter and MO is the one-word instruction memory register, provided with a function letter and tag decoder D*o*. It must be understood that the store (M) is organized in zones the individual addresses of which mark the locations allotted to programmes, or to subroutines, according to the case it may be. For an operation of translation of a programme, an appropriate instruction places in the register REL a base code for the translation, and said code is transferred to the register G, the address of said code being in the address register RA of the store (M) from which it is derived for G. The counter C*o* issues sequentially the addresses of the instructions to be executed for the translation, said addresses being transferred to RA in their sequence. Each instruction extracted from (M) is introduced into the one-word instruction register M*o*. For the purpose and needs of the invention, the decoder D*o* of M*o* is shown with an output for a tag C which, when present, indicates that the operand address then existing on the input operand address terminal AOP duly pertains to the zone of the store affected to the concerned programme, pointed to by the present content of the register G. The operand address codes may come as well from Mo than from REL, directly or after a modification, according to well known computer organization. C*o* delivers codes AIN and, of course, said operand address codes AOP and said instruction address codes AIN cannot coexist at any time of operation. The codes AOP and AIN are both applied to an input terminal A of an adder ADD. The other input of said adder will receive, when necessary, the content of G, in which case the code issuing from the adder ADD and applied to RA will point an address of the memorisation zone of the programme in the store (M). When the code from G is not authorized to reach the adder, the address register RA of the store will receive the code applied to the terminal A of the adder.

The output of the register G is connected to the adder ADD through a gate arrangement P2 controlled from the union (i.e., OR operation) of the outputs of a bistable member B. The OR-circuit is shown at OU. The output T of the bistable member B is directly connected to the OR-circuit OU whereas the other output R of B is connected to OU through a gate P1. When the output T is activated, during any operation of translation of a programme in (M), the gate P2 is unblocked so that the content of the translation base code register G is permanently added to the operand or instruction codes AOP and AIN. The output R of B is activated during any operation of reentrance of a subroutine in (M). The gate P1 is blocked unless two conditions simultaneously exist: when the tag C is decoded in Do and during the phase AN of execution of an instruction, said phase being the one during which a data is expected for the store. The AN signal comes of course from the usual phase circuit arrangement CP which is activated from the function letter decoder output F of the decoder Do. It results from such a logical organization that, during a subroutine reentrance operation, any data pertaining to the programme which had previously called for the subroutine will be placed in (M) at a location of the zone pointed to by the content of G, as both gates P1 and P2 will be unblocked. On the other hand, any invariant data pertaining to the subroutine will be placed in (M) at a location pointed to by the code applied at A, unmodified, i.e., at a location pertaining to the subroutine proper.

If the bove described device were not provided, the invariant data of the sub-routines should be copied in the zones of the store affected to the programmes since such invariant data could not, in reentrance condition, be provided with addresses pertaining to the said subroutines in the store (M).

The condition of the bistable member B is defined as follows: a translation or a reentrance operation is initiated by introduction into M*o* of an instruction which brings into REL and thereafter in M*o* an instruction word defining the character of the operation to come. In said instruction word a tag exists which marks either a reentrance or a translation operation and said tag C has its value copied on the bistable member B for memorization thereof. When said tag value corresponds to a translation of a programme, the member B is set for activation of its output T. When, on the other hand, the tag value is directed to a reentrance of a subroutine, the member B is set for activation of its output R. In any case, further, a code is introduced into the register G for pointing the zone of the store (M) allotted to the words of the programme which is concerned in the translation or the reentrance operation.

Figure 2:
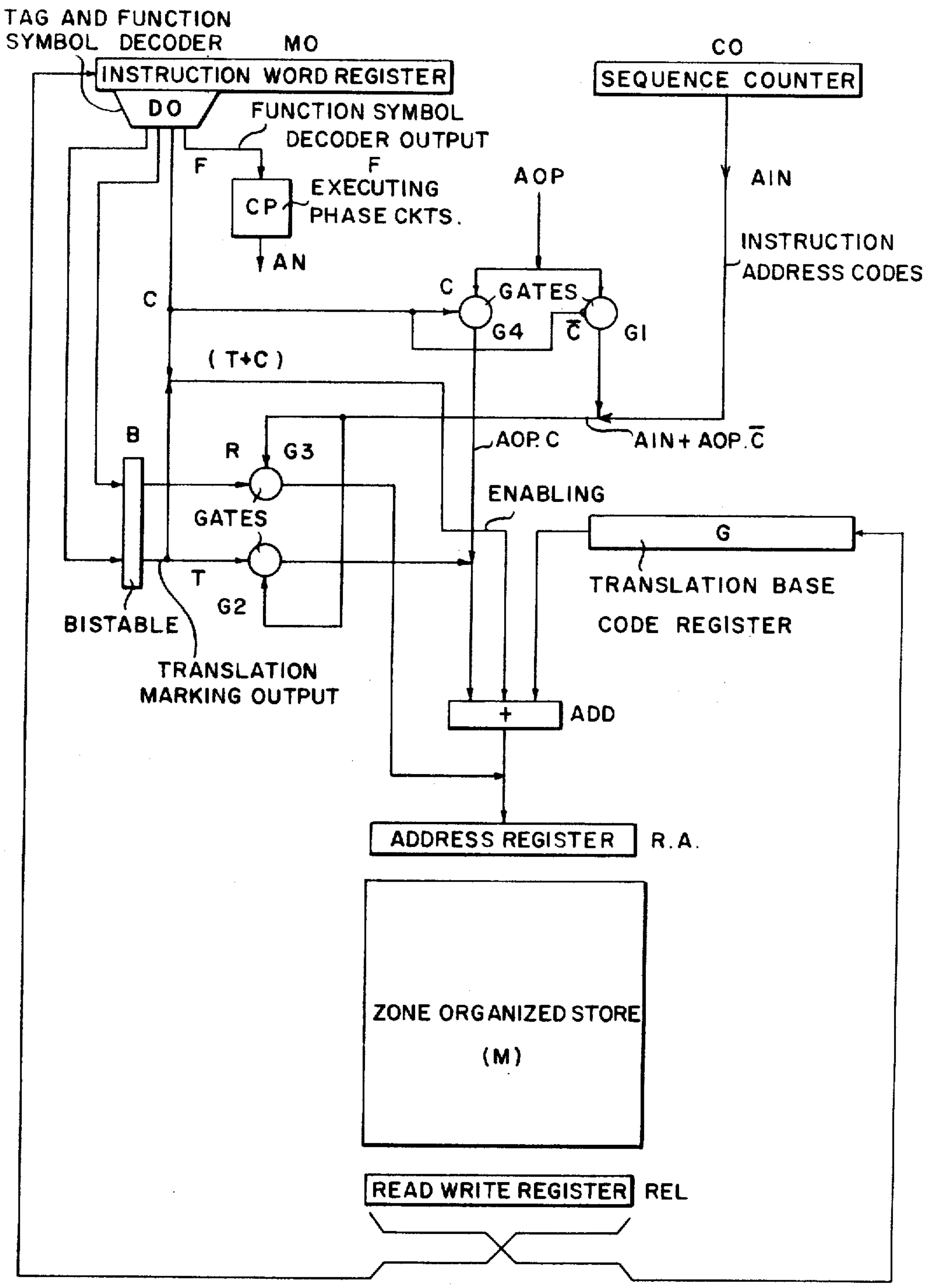
FIG. 2 shows a modification of the embodiment shown in FIG. 1.

A modification of the device shown in FIG. 1 is illustrated in FIG. 2 may be as follows: the bistable member B is provided with two gates G2 and G3 in its respective outputs for controlling the selective unblocking thereof. On the information inputs of said gates are applied all the instruction address codes AIN and all codes AOP formed by gate G1 when the tag C is not present in Mo; i.e. all signals satisfying to the logical relation (AIN + AOP·C). The output of the gate G3 controlled from the R output of B is directly connected to the input of the address register RA. The output of the gate G2 controlled from the T output of B is connected to one input of ADD which receives the content of G on its other input. any operand address code AOP of an instruction wherein the tag C exists, that is to say, any code (AOP·C) by gate G4, is applied to the same input of the adder connected to the output of the gate controlled from T. The output of the adder is connected to an input of the address register RA. The signal enabling the addition is the logical signal T + C.

What is claimed is:

1. A device for controlling program translation and subroutine reentrance operations in a zone organized store, which is a part of a multi-programmed digital data processing system including an instruction word register and tag value decoder thereof, instruction address code and operand address code bus leads, a store zone base address code register and an adder having a first input connected to the said instruction address code and the said operand address code bus leads, a second input connected to the said store zone base address code register and an output connected to an input of an address register in said store, comprising in combination:

a tag value decoder having an output, descriptive, when activated at the initiation of a store operation, of either a program translation or of a subroutine reentrance condition of said operation;

a bistable member connected to said tag value decoder output for memorization of such a condition and having a first output and a second output respectively descriptive, when activated, of the said program translation and subroutine reentrance conditions of the operation of the store;

said tag value decoder, having a further output, descriptive when activated during a subroutine reentrance operation, of an operand word extraneous to the subroutine invariants;

first gating means controlled by the activation of the first output of said bistable member and having an output enabling the operation of said adder; and second gating means controlled by the activation of the said further tag value decoder output and having an output enabling the operation of said adder.

2. A device according to claim 1, wherein said first gating means comprises a gate inserted between the store zone base address code register and the second input of the adder and wherein said second gating means comprises a gate inserted between the second output of said bistable member and a control input of the gate of said first gating means.

3. A device according to claim 1, wherein said first gating means comprises a gate inserted between the bus leads of the instruction address code and operand address code and the said second input of the adder, said second gating means comprises a gate inserted between the bus lead of the operand address code bus lead and the said second input of the adder and wherein a third gate having a control input connected to the second output of said bistable member connects bus leads of the instruction address code and operand address code to an input of the address register in the store.

4. In a multiprogrammed digital date processing system including a zone organized store having an address register, instruction address code and operand address code bus leads, a tagged instruction word register having tag value decoder means, a store zone base address register and an adder having a first input connected to the instruction address code and operand address code bus leads, a second input connected to the said store zone base address code register and an output connected to an input of the address register, a program translation and subroutine reentrance control device comprising in combination:

a tag value decoder output descriptive, when activated at the initiation of a store operation, of either a program translation or a subroutine reentrance condition of said operation and further descriptive, during a subroutine reentrance operation of an operand word extraneous to the subroutine invariants, the tag decoded values being the same for describing a subroutine reentrance operation and a subroutine reentering operand word extraneous to the subroutine invariants;

a bistable member connected to said tag value decoder output for memorizing the condition of a store operation and having a first and a second output respectively descriptive, when activated, of the said program translation and subroutine reentrance conditions of the operation;

first gating means controlled from the first output of said bistable member and enabling the operation of the adder, in an activated condition of said bistable member output; and second gating means controlled from said tag value decoder output and enabling the operation of said adder when the condition of said decoder output describes a subroutine reentrance operand word extraneous to the invariants of the subroutine.

5. In a multiprogrammed digital data processing system having an instruction-word register and decoder thereof, instruction address code and operand address code bus leads, a zone organized program and subroutine store having an address register, a store zone base address register and an address register access channel from the bus leads, which includes conditional means for adding the content of the store zone base address register to the address codes from said bus leads, the combination comprising:

two-condition tag means and decoder output thereof in the instruction-word register, the first condition of said tag means describing a program translation translation operation and the second one of describing a subroutine reentrance operation in instructions initiating the operation of the store and said second condition of said tag means further describing, during a subroutine reentrance operation, an operand word extraneous to the invariants of said subroutine;

a bistable member memorizing the condition of said tag decoder output in a store operation initiating instruction in the instruction-word register, said bistable member having first and second outputs respectively descriptive, when activated, of a programme translation or a subroutine reentrance operation of the store;

address register access channel control means having inputs connected to the outputs of the said bistable member and to the said decoder output, including first means enabling the access channel conditional adder means responsive to activation of the first output of said bistable member, second means enabling the access channel conditional adder means responsive to activation of the decoder output to its second condition during activation of the said second output of said bistable member, and third means disabling the access channel conditional adder means responsive to activation of the said second output of said bistable member and simultaneous activation to its first condition of said decoder output.

* * * * *